(12) United States Patent
Hazra et al.

(10) Patent No.: US 10,282,483 B2
(45) Date of Patent: May 7, 2019

(54) CLIENT-SIDE CACHING OF SEARCH KEYWORDS FOR ONLINE SOCIAL NETWORKS

(71) Applicant: Facebook, Inc., Menlo Park, CA (US)

(72) Inventors: Kurchi Subhra Hazra, Mountain View, CA (US); Igor Ribeiro de Assis, San Francisco, CA (US); Jun Jin, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 279 days.

(21) Appl. No.: 15/228,866

(22) Filed: Aug. 4, 2016

(65) Prior Publication Data

US 2018/0039691 A1 Feb. 8, 2018

(51) Int. Cl.
*G06F 17/30* (2006.01)
*G06Q 50/00* (2012.01)

(52) U.S. Cl.
CPC ....... *G06F 17/30902* (2013.01); *G06Q 50/01* (2013.01)

(58) Field of Classification Search
USPC .................................................. 707/728, 759
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |

(Continued)

*Primary Examiner* — Hung T Vy
(74) *Attorney, Agent, or Firm* — Baker Botts L.L.P.

(57) ABSTRACT

In one embodiment, a method includes receiving a text query inputted by a first user of an online social network, the text query including one or more n-grams. The method also includes identifying a first set of candidate keywords from multiple keywords stored on a local cache of a client system, each keyword being extracted from a source of multiple sources associated with the online social network, where each candidate keyword in the first set matches one or more n-grams of the text query and calculating a rank for each of the identified candidate keywords based at least in part on the source associated with the candidate keyword. The method also includes displaying, in response to the first user inputting the one or more n-grams of the text query, one or more suggested queries, each suggested query including an identified candidate keyword having a rank higher than a threshold rank.

19 Claims, 6 Drawing Sheets

(56) References Cited

U.S. PATENT DOCUMENTS

| | | |
|---|---|---|
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184936 A1* | 7/2011 | Lymberopoulos ........................ G06F 17/30902 707/721 |
| 2011/0184981 A1 | 7/2011 | Lu |
| 2011/0191371 A1 | 8/2011 | Elliott |
| 2011/0196855 A1 | 8/2011 | Wable |
| 2011/0213655 A1* | 9/2011 | Henkin ................. G06Q 30/00 705/14.49 |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |

(56) References Cited

U.S. PATENT DOCUMENTS

| | | |
|---|---|---|
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2016/0026727 A1 | 1/2016 | Bar-Yossef |
| 2016/0171115 A1* | 6/2016 | Jheeta ............... G06F 17/30867 707/723 |

* cited by examiner

CLIENT-SIDE CACHING OF SEARCH KEYWORDS FOR ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a client system of a user of the online social network may provide the user customized keyword query suggestions based on one or more keywords extracted from one or more sources associated with the online social network and cached on the client system. A user interface of the social-networking system may comprise fields for displaying one or more query suggestions associated with each search instance. Query suggestions may be provided to the user in response to the user inputting a partial text query. Rather than continuing to input a complete search query into the query field, a user may conduct a search against the online social network by, for example, clicking on one of the query suggestions. The provision of query suggestions to the querying user may be delayed by one or more factors such as the time spent on retrieving keywords associated with the user, generating the query suggestions, and sending information between the social-networking system and the client system. This delay may be reduced if the query suggestions are generated client-side based on client-side cached search keywords and locally provided to the querying user. Under this approach, the social-networking system may extract a plurality of search keywords from one or more sources associated with the online social network for caching on the client system. The sources may comprise, for example, information associated with one or more entities of the online social network, a search history associated with the querying user, trending topics on the online social network, popular search terms used by users of the online social network, one or more places associated with the querying user, another suitable source, or any combination thereof. After receiving the extracted search keywords from the social-networking system, the client system may store them on a local cache. The client system may generate, based on the cached keywords, one or more keyword query suggestions matching a text query inputted by the querying user. It may then rank and provide one or more of the keyword query suggestions to the user. The generation and provision of the keyword query suggestions may be performed by an application or process associated with the online social network that is stored or installed on the client system.

As an example and not by way of limitation, a user may start a search against the online social network by inputting a text query "Tes" in a query field. The user's client system may have cached one or more search keywords received from the social-networking system, including the keyword "tesla model 3." The social-networking system may have extracted this keyword from a list of trending-topic keywords that it maintains and sent the keyword to the user's client system. The client system may then generate one or more keyword query suggestions (e.g., "tesla model 3 price") based on the keyword "tesla model 3" and one or more other keywords, rank the generated keyword query suggestions, and provide one or more of them for display to the user. The user may then click on one of the keyword query suggestions to search the online social network using the selected query.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
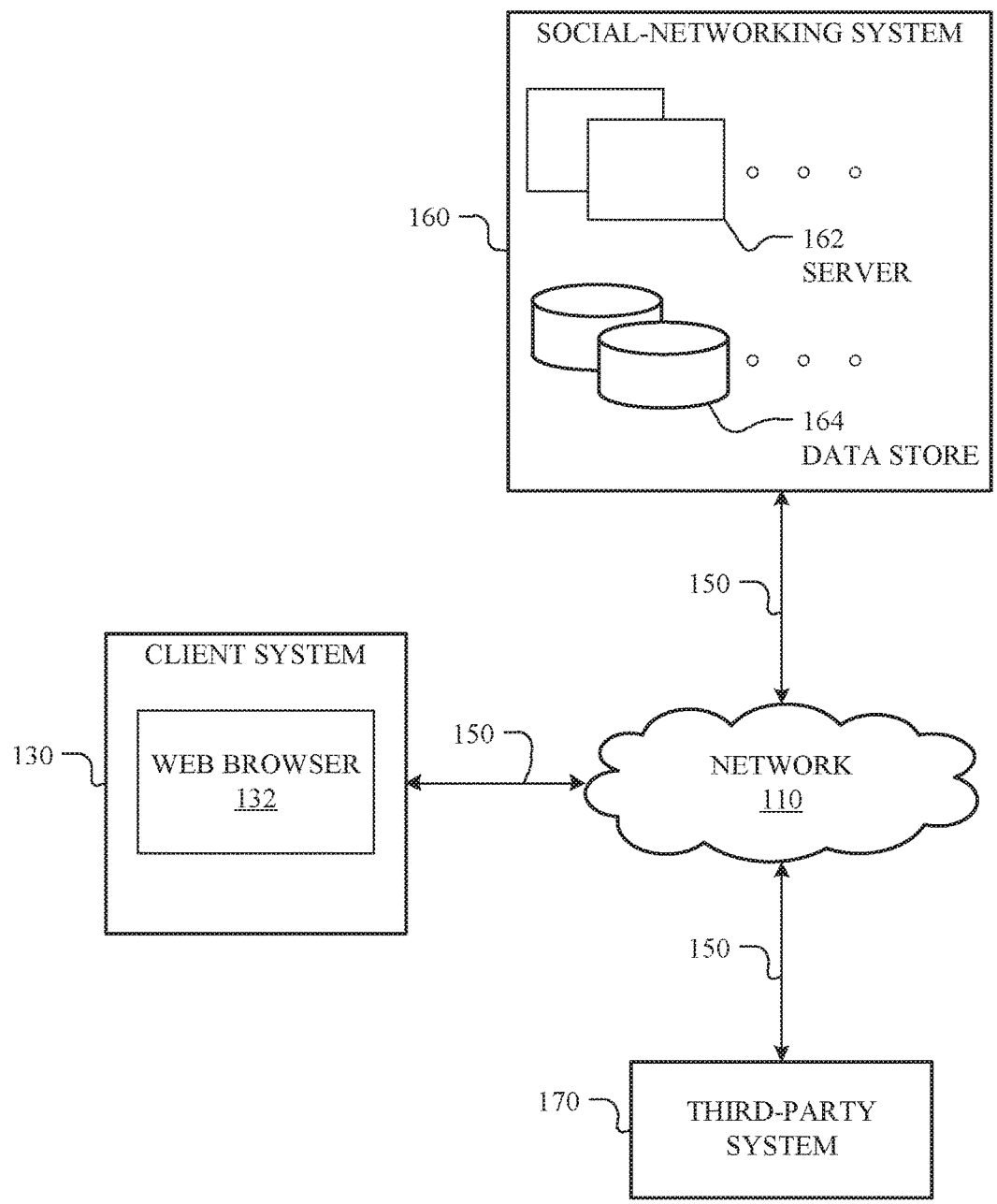
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
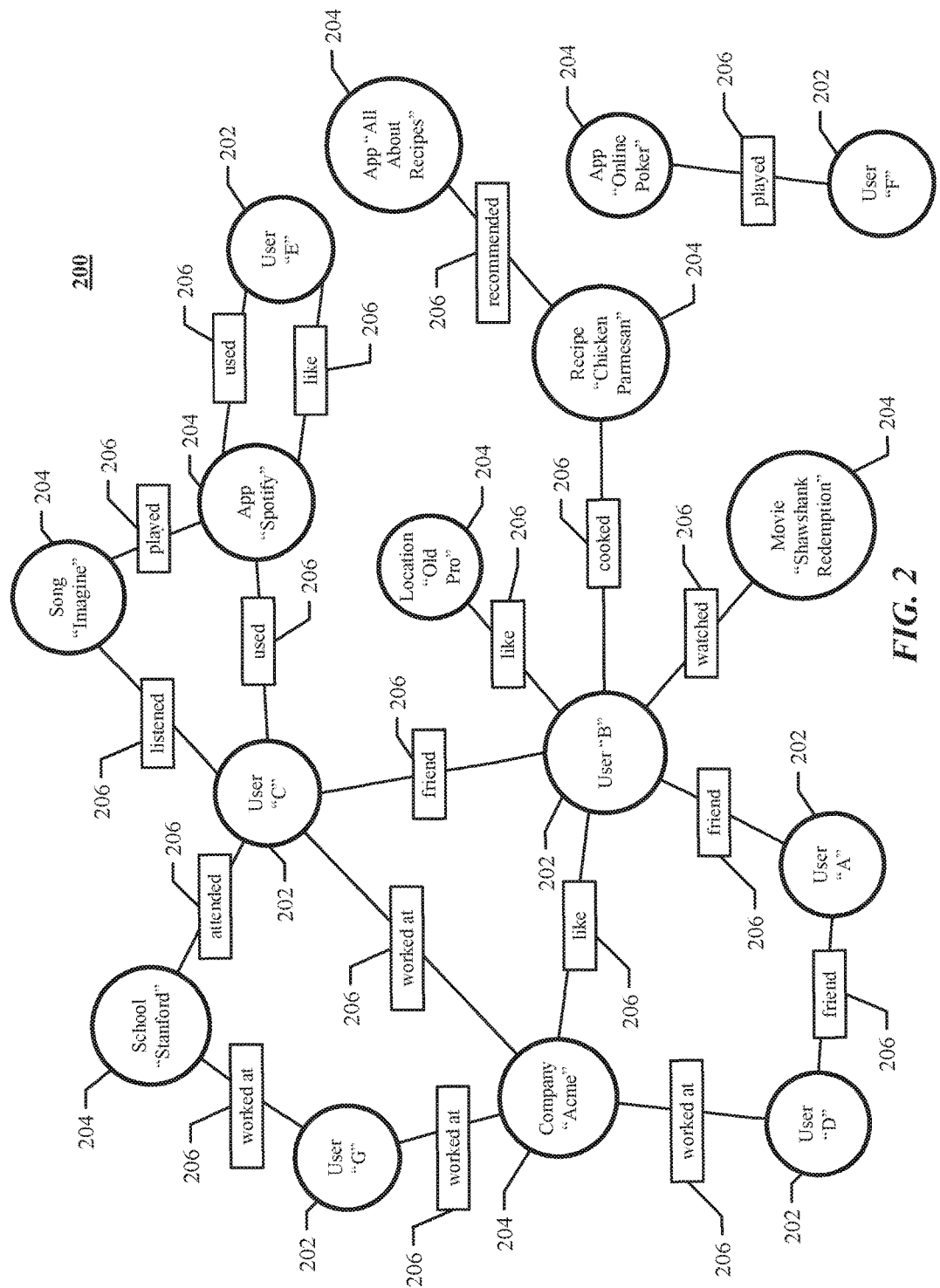
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other interactable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
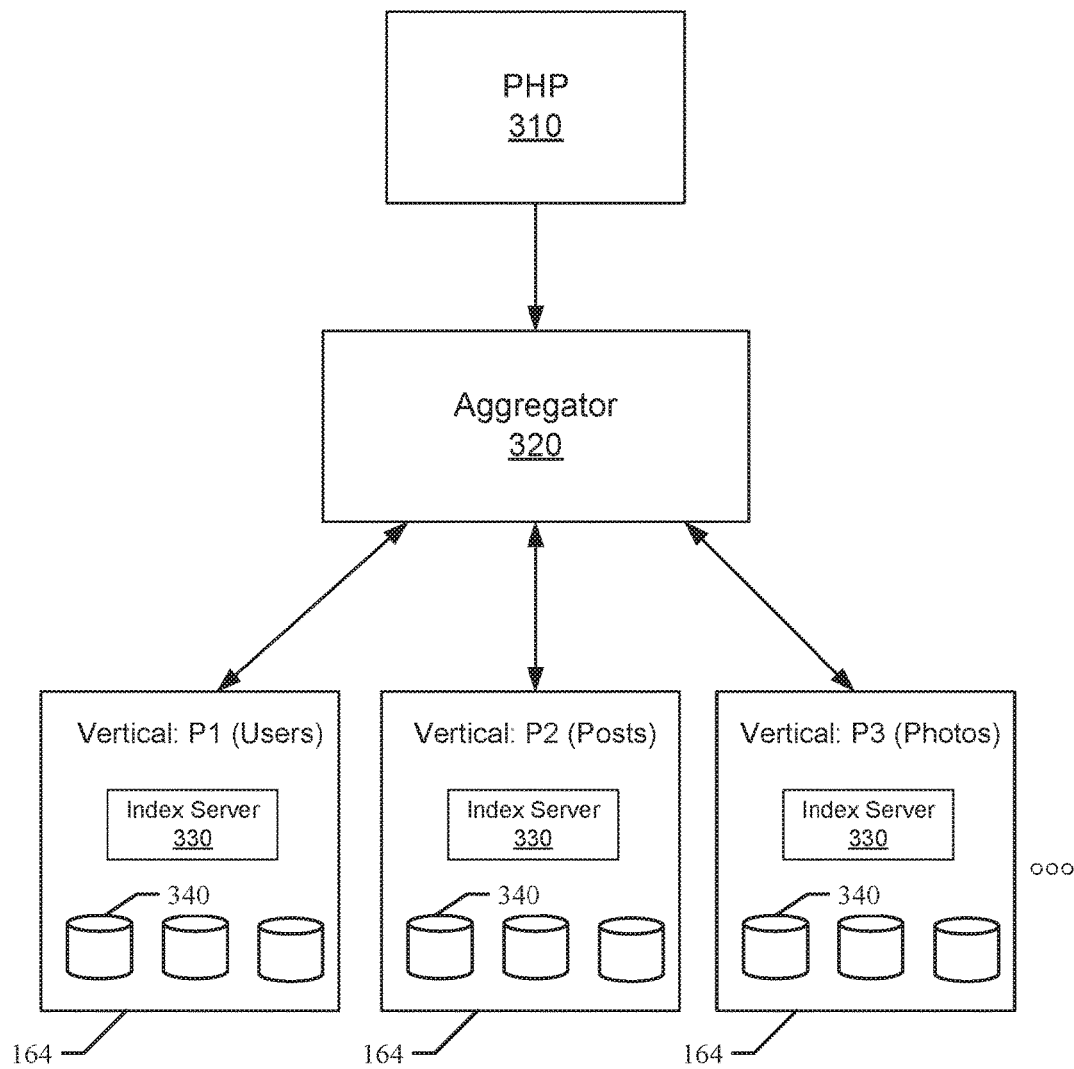
FIG. 3 illustrates an example partitioning for storing objects of social-networking system 160.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Client-Side Caching of Search Keywords

In particular embodiments, the social-networking system 160 may cache a plurality of search keywords on a client system 130 associated with a user of the online social network and provide the user keyword query suggestions generated based on the cached keywords. The user may conduct a search against the online social network by inputting a text query into a user interface of the social-networking system 160 (e.g., a query field). The text query may comprise one or more n-grams. In response to the user's input, the social-networking system 160 may identify or generate (e.g., via a typeahead process) a plurality of keyword query suggestions that match one or more n-grams of the text query. In particular embodiments, the social-networking system 160 may generate one or more keyword query suggestions in response to the inputted text query and send them to the user's client system 130 in real time. Under this approach, the provision of keyword query suggestions may be delayed by the transmission of information between one or more servers 162 of the social-networking system 160 and the client system 130. In particular embodiments, the social-networking system 160 may cause a plurality of search keywords to be cached on a local cache of the user's client system 130. The cached keywords may have been obtained from one or more sources associated with the online social network. In response to the user inputting a text query, the client system 130 may generate one or more keyword query suggestions locally based on the cached keywords. This approach may allow a wide spectrum of keyword query suggestions matching a text query inputted by the user to be provided to the user with reduced latency, thereby improving the quality and efficiency of the search experience.

A plurality of search keywords cached on the client system 130 may be extracted by the social-networking system 160 from one or more sources associated with the online social network. In particular embodiments, the social-networking system 160 may identify one or more entities (e.g., users, concepts) associated with the querying user on the online social network. It may select one or more entities having a high affinity coefficient with or otherwise related to the user (e.g., first-degree friends, groups that the user belongs to, events that the user has registered for or participated in) and cache information (e.g., names of the friends, groups, events, etc.) about the entities on the user's client system 130 in order to facilitate fast provision of such information to the user (e.g., real-time typeahead functionality). The scope of such cached information may be extended to search keywords obtained from other sources such as a search history associated with the querying user, trending topics on the online social network, popular search terms used by users of the online social network, other suitable sources, or any combination thereof. After receiving the extracted search keywords from the social-networking system 160, the client system 130 may store them on a local cache. The client system 130 may generate, based on the cached keywords, one or more keyword query suggestions matching a text query inputted by the querying user. It may then rank and provide one or more of the keyword query suggestions to the user. The generation and provision of the keyword query suggestions may be performed by an application or process associated with the online social network that is stored or installed on the client system 130.

As an example and not by way of limitation, a user may start a search against the online social network by inputting a text query "Tes" in a query field 405. The user's client system 130 may have cached one or more search keywords received from the social-networking system 160, including the keyword "tesla model 3." The social-networking system 160 may have generated this keyword based on a list of trending-topic keywords that it maintains and sent the keyword to the user's client system 130. The client system 130 may then generate one or more keyword query suggestions (e.g., "tesla model 3 price") based on the keyword "tesla model 3" and one or more other keywords, rank the generated keyword query suggestions, and provide one or more of them for display to the user. The user may then click on one of the keyword query suggestions to search the online social network using the selected query. As another example and not by way of limitation, a user may input "aveng" in a query field 405 associated with the online social network. The social-networking system 160 may have sent to the user's client system 130 the keyword "avengers" for caching. This keyword may have been obtained from a search history associated with the user. In addition to the keyword "avengers," the client system 130 may have also cached the keywords "iron man" "captain America," and "hulk." The client system 130 may further store an index indicating that the latter keywords are each related to the keyword "avengers." Based on the cached keywords, the client system 130 may then locally generate the additional keyword query suggestions "avengers iron man" "avengers captain America," and "avengers hulk" to be displayed to the user for selection. Although this disclosure describes providing keyword query suggestions based on client-side cached keywords in a particular manner, this disclosure contemplates providing keyword query suggestions based on client-side cached keywords in any suitable manner.

In particular embodiments, the client system 130 of a user of the online social network may receive a text query inputted by the user. The received text query may comprise one or more n-grams. The text query may be an unstructured text query. The text query may be entered, for example, into a query field 405. The query field 405 may be presented to the user via a webpage displayed by a web browser 132 on the user's client system 130 or via an application associated with the online social network installed on the user's client system 130. In particular embodiments, the text query inputted by the user may be sent from the user's client system 130 to the social-networking system 160 via the network 110. As an example and not by way of limitation, the client system 130 may start providing suggested keyword queries to a user as soon as it receives the text query "t" from the user (via a typeahead process). As another example and not by way of limitation, the client system 130 may receive a text query "iron man" from a user. The text query may comprise at least the n-grams "iron," "man," and "iron man." Although this disclosure describes receiving particular queries in a particular manner, this disclosure contemplates receiving any suitable queries in any suitable manner.

In particular embodiments, the client system 130 may identify a set of candidate keywords from a plurality of keywords stored on a local cache of the client system 130. Each keyword of the plurality of cached keywords may have been extracted from a source of a plurality of sources associated with the online social network. Each of the candidate keywords in the set may match one or more n-grams of the text query. The search keywords cached on the client system 130 may have been received from the social-networking system 160. The social-networking system 160 may have extracted the keywords from a plurality of sources and sent the keywords to the client system 130 for caching before a search attempt by the querying user. The sources from which the social-networking system 160 may extract search keywords may comprise, for example, information about entities of the online social network, a search history associated with the user, a list of trending-topic keywords maintained by the social-networking system 160, a list of popular-search keywords maintained by the social-networking system 160, information associated with one or more places associated with the user, another suitable source, or any combination thereof. As an example and not by way of limitation, the user may input a text query "Tes" in a query field 405 associated with the online social network. In response to the inputted text query, the client system 130 of the user may search through a plurality of search keywords received from the social-networking system 160 and stored on a local cache of the client system 130 to identify those that match the n-grams of the inputted text query. In particular, the client system 130 may identify the candidate keywords "tesla," "tested," and "tessa thompson." In this example, each of the identified candidate keywords comprises the n-gram "tes." In particular embodiments, the social-networking system 160 may search through a plurality of search keywords stored on a local cache of the client system 130 to identify those that at least partially match the n-grams of the inputted text query. As another example and not by way of limitation, in response to the inputted text query "avengers age," the client system 130 may identify from a local cache the candidate keywords "avengers age of ultron," "avengers," and "age of empires." Each of the identified candidate keywords may have been received from the social-networking system 160 and may match at least one n-gram of the inputted text query. Although this disclosure describes identifying a set of candidate keywords from a plurality of cached search keywords in a particular manner, this disclosure contemplates identifying a set of candidate keywords from a plurality of cached search keywords in any suitable manner.

In particular embodiments, the keywords stored on the local cache of the client system 130 may comprise one or more keywords associated with one or more entities of the online social network. In particular embodiments, the social-networking system 160 may identify one or more entities (e.g., users, concepts) associated with the querying user on the online social network. The identification of the entities may be based on their relationships with the user or one or more interests of the user. Specifically, the social-networking system 160 may identify, for example, those entities that have a high affinity coefficient with the querying user, one or more other users who are friends or friends of friends of the querying user on the online social network, one or more groups that the querying user belongs to, one or more events that the querying user has registered for or participated in, other related entities, or any combination thereof. It may further identify one or more entities that the querying user has expressed interest in such as, for example, a celebrity who is followed by the user. The social-networking system 160 may create specialized pages comprising content (e.g., photos) about celebrities who are frequently searched, visited, or mentioned by users of the online social network. The querying user may be allowed to follow a celebrity by subscribing to updates from such a specialized page for the celebrity. After identifying the entities associated with the querying user, the social-networking system 160 may then extract one or more keywords from information associated with the identified entities. The extracted keywords for each entity may comprise a name of the entity, a word or phrase appearing in a post of the entity, metatags or other metadata associated with the entity, other suitable keywords, or any combination thereof. As an example and not by way of limitation, the social-networking system 160 may identify the entity Elon Musk as one related to the querying user. This identification may be based on the fact that the querying user is following a specialized page created for the celebrity Elon Musk. The social-networking system 160 may extract the search keyword "tesla" from a post on the specialized page and send it to the user's client system 130 for caching. As another example and not by way of limitation, the social-networking system 160 may identify the entity Mike Smith as being related to the querying user. This identification may be based on a high affinity coefficient between Mike and the user and the fact that they are friends on the online social network. The social-networking system 160 may extract the search keyword "Mike Smith" directly from the biographical information of the corresponding entity and extract the search keyword "avengers" from a movie review posted by Mike. It may then send the extracted keywords to the client system 130 of the querying user for caching.

In particular embodiments, the keywords stored on the local cache of the client system 130 may comprise one or more keywords extracted from a search history associated with the querying user. The social-networking system 160 may create and store a search history for each of one or more users. The search history may comprise, for each search instance, at least a search query used and a timestamp. The search history may only cover the searches conducted by the user within a particular timeframe. The social-networking system 160 may extract one or more keywords from the user's search history and send them to the user's client system 130 for caching. The local caching of keywords from a user's search history may be motivated by the idea that the user is likely to conduct searches using queries that are identical or similar to those that the user has used before. As an example and not by way of limitation, the querying user may have searched against the online social network using the term "tesla model 3." The social-networking system 160 may record this query as an entry in the user's search history. It may further send this keyword to the user's client system 130 for caching.

In particular embodiments, the keywords stored on the local cache of the client system 130 may comprise one or more keywords extracted from a list of trending-topic keywords. The social-networking system 160 may continuously detect the activities of a plurality of users of the online social network such as, for example, searching, posting, commenting, sharing, another suitable activity, or any combination thereof. The detecting may be subject to privacy settings of each of the users involved. By doing so, the social-networking system 160 may identify a plurality of keywords that are trending on the online social network at the moment. The identified keywords may be compiled into a list of trending-topic keywords. Whether a particular keyword is trending (e.g., in terms of a level of popularity of the keyword) may be characterized by a function of any combination of one or more factors corresponding to the activities detected. As an example and not by way of limitation, the function for characterizing the level of popularity of a particular keyword may be represented by the following expression: $f_{t_1 \to t_2}(m_1, m_2, m_3)$, where $m_1$, $m_2$, and $m_3$ correspond to the number of searches, posts, and comments comprising the keyword on the online social network, respectively. The variables $m_1$, $m_2$, and $m_3$ may be evaluated within a specified timeframe from a time $t_1$ to a time $t_2$. The function may return a positive number if and only if the level of popularity of the keyword meets a specified threshold such that the keyword is eligible of being included in the trending-topic list. The function may return zero or a negative number otherwise. The social-networking system 160 may update this trending-topic list frequently so that it accurately represents the "trend" on the online social network. Due to the "trending" nature of the keywords that are included in this list, the social-networking system may impose a time limit on the keywords. It may automatically remove any keyword that has stayed on the trending-topic list for a specified amount of time. Alternatively or additionally, the social-networking system 160 may include a time factor in the function characterizing the popularity of the keywords. As an example and not by way of limitation, the function described above may be modified to be $f_{t_1 \to t_2}(m_1, m_2, m_3, m_4)$, where $m_4$ corresponds to a length of time that a keyword has stayed on the trending-topic list. As another example and not by way of limitation, the variables $m_1$, $m_2$, and $m_3$ in the function $f_{t_1 \to t_2}(m_1, m_2, m_3)$ discussed above may correspond to rates of change for different types of activities on the online social network rather than the count of the number of these activities. This modification allows the social-networking system 160 to catch those keywords that have recently become trending. The list of trending-topic keywords may be stored on one or more data stores 164 of the social-networking system 160. The social-networking system 160 may select one or more keywords from this list to send to the client system 130 of the querying user for caching. As an example and not by way of limitation, right after the Brussels bombings on 22 Mar. 2016, the social-networking system 160 may have detected a quickly increasing amount of searches, posts, comments, and shares of content about the tragic incident. It may therefore include the keyword "brussels attack" in the list of trending-topic keywords and send it to a querying user's client system 130 for caching. More information on trending topics may be found in U.S. patent application Ser. No. 14/858,366, filed 18 Sep. 2015, which is incorporated by reference.

In particular embodiments, the keywords stored on the local cache of the client system 130 may comprise one or more keywords extracted from a list of popular-search keywords. The social-networking system 160 may detect searches conducted by its users. The detecting may be subject to the user's privacy settings. It may analyze statistics about the searches and identify queries that are used most frequently at the moment or within a specified timeframe. Keywords used in the identified queries may be included in a list of popular-search keywords. In particular embodiments, the keywords on the popular-search list may not be subject to time limits. Particular keywords that are continuously being used in searches at a high frequency may stay on the popular-search list for an extended period of time. Alternatively, the keywords on the popular-search list may be subject to time limits in a way similar to those on the trending-topic list. The keywords included in the popular-search list may or may not overlap with the keywords included in the trending-topic list. The list of popular-search keywords may be stored on one or more data stores 164 of the social-networking system 160. The social-networking system 160 may select one or more keywords from this list to send to the client system 130 of the querying user for caching. As an example and not by way of limitation, there may constantly be a large number of users of the online social network searching using the term "weather." By analyzing search-related statistics, the social-networking system 160 may include "weather" in its list of popular-search keywords and send this keyword to a querying user's client system 130 for caching.

In particular embodiments, the keywords stored on the local cache of the client system 130 may comprise one or more keywords associated with one or more geographic locations associated with the querying user. The social-networking system 160 may access one or more sensors of a user's client system 130 with proper permission from the user. One or more of the sensors (e.g., GPS) may be functional to determine a location of the user. The social-networking system 160 may determine a current location of the user based on data obtained from the sensors. In addition, based on historical data obtained from the sensors and information inputted by the user, the social-networking system 160 may also determine and record one or more "hotspots" for the user. The hotspots may comprise, for example, the user's residence, the user's workplace, places that the user frequents. In addition, the social-networking system 160 may determine that one or more places near the above-described locations are related to the user. It may access information about one or more of the places determined to be related to the user and extract search keywords from the accessed information. Such keywords may then be sent to the client system 130 of the user for caching. As an example and not by way of limitation, the social-networking system 160 may determine from historical data that a user's home is located in New York City and that the user frequents the Central Park. Based on this determination, the social-networking system 160 may extract one or more search keywords from information about New York City, the Central Park, and one or more places (e.g., restaurants, shopping malls, landmarks) near the Central Park and send the extracted keywords to the user's client system 130 for caching. More information on determining hotspots for users may be found in U.S. patent application Ser. No. 14/323,915, filed 3 Jul. 2014, which is incorporated by reference. Although this disclosure describes extracting keywords from particular sources in a particular manner, this disclosure contemplates extracting keywords from any suitable sources in any suitable manner.

In particular embodiments, the social-networking system 160 may identify, from the sources associated with the online social network, one or more of the keywords to be stored on the local cache of the client system 130 based on one or more factors. The factors may comprise the sources associated with the keywords, pre-assigned static scores for the keywords calculated by a server-side process of the online social network, a geographic location associated with the querying user, an interest associated with the querying user, a social-interaction history of a friend of the querying user on the online social network or a user of the online social network determined to be similar to the querying user, another suitable factor, or any combination thereof. In particular embodiments, the social-networking system 160 may extract more search keywords from the above-discussed sources than can be stored on the user's client system 130. This may necessitate selecting from the extracted search keywords those that will be cached client-side and caching only the selected ones. The social-networking system 160 may select one or more keywords from each source to be cached on the user's client system 130. The number of keywords to select from each source may be uniform. Alternatively, the social-networking system 160 may favor certain sources over others by selecting a larger number of keywords extracted from a favored source than a disfavored source. The social-networking system 160 may also calculate a static score for each of the extracted keywords using a server-side process. The calculation may be based on a plurality of factors, which may differ for different sources. Among keywords extracted from a particular source, those with the highest scores may be selected for client-side caching.

In particular embodiments, the selection of keywords to be cached may also be based on information associated with the querying user such as, for example, a location associated with the querying user, an interest of the querying user, information associated with a friend of the query user on the online social network or another user determined to be similar to the querying user. In particular embodiments, the social-networking system 160 may evaluate a popularity of each of one or more extracted keywords among users located near a location associated with the querying user and preferentially send the popular ones to the user's client system 130. As an example and not by way of limitation, the querying user may be located in the San Francisco Bay area. The social-networking system 160 may determine the current location of the user via one or more sensors on the user's client system 130. The social-networking system 160 may access social-networking information among a plurality of other users in the same region as the querying user and determine that the keyword "bart schedule" is frequently searched by those users (where "bart" refers to the Bay Area Rapid Transit system). The social-networking system 160 may then select "bart schedule" to be sent to the querying user's client system 130 for caching. In contrast, the keyword "bart schedule," although similarly extracted from a popular-search list, may not be selected to be cached on the client system 130 of another user located in the Los Angeles area because it is not popular among users nearby.

In particular embodiments, the social-networking system 160 may filter the extracted keywords based on one or more interests of the querying user and preferentially cache keywords associated with topics that the user is determined to be interested in. As an example and not by way of limitation, the social-networking system 160 may, with proper permissions from the querying user, access social-networking information of the user, such as information on a profile interface associated with the user. It may determine that the user often posts and shares content about sports and thereby determine that the user is interested in sports-related topics. Between the extracted keywords "lebron james" (a reference to the basketball player) and "barack obama" (a reference to the U.S. President), the social-networking system 160 may select the former for client-side caching based on the determined interest of the querying user in sports-related topics.

In particular embodiments, the social-networking system 160 may evaluate a popularity of each extracted keyword among users who are connected to the querying user on the online social network or who are determined to be similar to the querying user (e.g., users who attended the same college as the querying user, users who are in the same age group as the querying user) and preferentially cache those keywords that are popular. As an example and not by way of limitation, for a querying user who attend Davidson College, the social-networking system 160 may preferentially cache the keyword "stephen curry" (a reference to the basketball player who attended Davidson College) over "lebron james" (who attended St. Vincent-St. Mary High School) because Stephen Curry is popular among people who has attended his alma mater and who are similar to the querying user in that respect. Although this disclosure describes selecting one or more extracted keywords to be cached on a client system 130 in a particular manner, this disclosure contemplates selecting one or more extracted keywords to be cached on a client system 130 in any suitable manner.

In particular embodiments, the client system 130 may update the search keywords stored on its local cache. The search keywords may be updated periodically, upon detection of a trigger action, or both. The updates may be initiated by the social-networking system 160 by sending update notifications and new keywords to the client system 130 over the network 110. The updates may alternatively be initiated by the client system 130 by sending one or more update requests to the social-networking system 160. In the case that the cached keywords are updated periodically, the frequency of the updates may be pre-specified or dynamically adjusted. The frequency of updates may also be different for keywords extracted from different sources associated with the online social network. As an example and not by way of limitation, the social-networking system 160 may access one or more sources and identify a plurality of keywords to be cached on the client system 130 of the querying user once per day. Because the sources may have changed during each day (e.g., trending-topic list updated, user has conducted new searches) and the user may have had one or more actions on the online social network, one or more of the identified keywords may be different from those cached on the client system 130. The social-networking system 160 may then send data describing the updates to the client system 130. Specifically, the data may comprise information describing one or more search keywords to be added to the local cache and one or more keywords to be removed. Additionally, the social-networking system 160 may send one or more updates to the static scores assigned to the cached keywords to the client system 130. This frequency of once per day may be modified to, for example, twice per day or once every two days, based on the processing capabilities of the social-networking system 160, performance optimization concerns, or behavior of the querying user (e.g., how often the user uses the online social network). Furthermore, the social-networking system 160 may send out updates for keywords associated with more time-sensitive sources at a higher frequency (e.g., once per hour for trending-topic keywords) than for keywords associated with less time-sensitive sources (e.g., once per day for keywords associated with entities on the online social network).

In particular embodiments, the keywords stored on the local cache of the client system 130 may be updated upon detection of a trigger action. Possible trigger actions may comprise one or more signals detected at the client system 130 of the querying user, for example, a browser client 132 loading a webpage associated with the online social network, an application associated with the online social network that is installed on the client system being opened, the first user interacting with a query field 405 associated with the online social network, another suitable signal, or any combination thereof. As an example and not by way of limitation, a querying user may access the online social network on a computer via a web browser 132. The web browser 132 may send a request for keyword updates along with an IP request to the social-networking system 160. It may receive updates to the cached keywords from the social-networking system 160 when a webpage associated with the online social network is being loaded. As another example and not by way of limitation, as soon as a user opens an application associated with the online social network (e.g., the Facebook Mobile app) installed on a mobile client device 130, a request may be sent to the social-networking system 160 for updates for search keywords cached on the mobile device. As yet another example and not by way of limitation, within an interface associated with the online social network, a querying user may click on a query field 405 to initiate a search. The social-networking system 160 may detect the user's act and send updates to the cached keywords on the user's client system 130 in real time before the user types in the query field 405. In particular embodiments, the social-networking system 160 may predict one or more times of occurrence of trigger actions based on historical data associated with a querying user and proactively initiate updates to the cached keywords at the predicted times. On the other hand, the social-networking system 160 may refrain from updating the cached keywords when no trigger action is predicted to happen. As an example and not by way of limitation, a querying user may only access the online social network after returning home from work. The social-networking system 160 may detect that the user only conducts searches against the online social network between 6 p.m. and 7 p.m. every day. Accordingly, the social-networking system 160 may provide updates to keywords cached on the user's client system 130 once per day at 6 p.m. In particular embodiments, possible trigger actions may also comprise one or more signals received from the social-networking system 160 or another client device 130 associated with a querying user. As an example and not by way of limitation, the user may delete an entry of her search history maintained by the social-networking system 160 for privacy reasons. The social-networking system 160, in response, may delete the entry of search history from one or more of its data stores 164 as well as one or more client systems 130 associated with the user. This deletion may also trigger the removal of a search keyword corresponding to the deleted entry of the search history from a local cache of a client system 130. As another example and not by way of limitation, a user may add or remove a friend on the online social network. In response to such a trigger action, the social-networking system 160 may immediately add one or more keywords related to an added friend to a local cache of the client system 130 or remove one or more keywords corresponding to a removed friend from the local cache. More information on trigger actions may be found in U.S. patent application Ser. No. 14/466,269, filed 22 Aug. 2014, which is incorporated by reference.

In particular embodiments, the client system 130 may identify one or more of the search keywords stored on its local cache that are associated with one of the sources associated with the online social network. It may then only update the identified keywords. Each instance of update may be applied globally to all search keywords cached on a client system 130 or specifically to only a fraction of the keywords, which are associated with particular sources. As an example and not by way of limitation, keywords obtained from time-sensitive sources (e.g., the trending-topic list, the popular-search list) may be updated after each period of one hour, while keywords obtained from other sources (entities, search history, places) may be updated every twelve hours. As another example and not by way of limitation, for updates triggered by particular trigger action, the client system 130 may only update keywords related to the trigger actions. For example, in response to the user adding a friend on the online social network, only keywords associated with entities that are cached on the user's client system 130 may be updated. Although this disclosure describes updating cached keywords in a particular manner, this disclosure contemplates updating cached keywords in any suitable manner. More information on client-side caching of search keywords may be found in U.S. patent application Ser. No. 15/133,620, filed 21 Apr. 2016, which is incorporated by reference.

In particular embodiments, the client system 130 may generate one or more keyword queries. Each of the keyword queries may comprise an identified candidate keyword matching the text query inputted by the user. After the client system 130 has identified one or more candidate keywords that match the text query inputted by the user from the cached search keywords, it may use the candidate keywords to construct one or more keyword queries. A keyword query may simply be a candidate keyword. As an example and not by way of limitation, in response to the text query "Tes" inputted by the user, the client system 130 may identify the locally cached keyword "tesla model 3" as matching the text query. It may then generate "tesla model 3" as a keyword query.

In particular embodiments, a keyword query may be generated by combining an identified candidate keyword with one or more n-grams according to a query template stored on the client system 130. In addition to providing a cached search keyword directed to a query user as a keyword query suggestion, the client system 130 may also locally modify a cached keyword to generate a keyword query. A keyword query may be generated by combining more than one candidate keywords. The client system 130 may determine that two candidate keywords are compatible with each other and combine them into a keyword query. This determination may be based on an index received from the social-networking system 160 and stored on the client system 130 indicating the keywords that are compatible with each other. The determination may alternatively or additionally be based on one or more "templates." The templates may indicate types of keywords that may be combined to form a keyword query. They may also indicate one or more n-grams that may commonly be combined with candidate keywords. As an example and not by way of limitation, the client system 130 may store a first set of keywords "iron man," "captain America," and "hulk" as well as a second set of keywords "age of ultron" and "infinity war." Each keyword in the first set may be combined with each keyword of the second set to form a keyword query (e.g., "iron man age of ultron," "captain America infinity war"). The client system 130 may store an index specifying these combination options. For example, the index may specify that the keyword indexed 1 "iron man" is compatible with each of the keywords indexed 4 and 5, "age of ultron" and "infinity war." The client system 130 may create the combinations based on the index. Alternatively, the above described search keywords may each be associated with a category that is also cached on the client system 130. For example, the keywords "iron man," "captain America," and "hulk" may each be assigned the category "avengers superhero." The keywords "age of ultron" and "infinity war" may each be assigned the category "avengers sequel." One or more templates stored on the client system 130 may specify that a keyword query may be created by combining a keyword of one category with one of another category. For example, a template expressed like "[avengers superhero] [avengers sequel]" may be used to indicate that the above keywords may be combined according to their categories. As another example and not by way of limitation, a template may specify that one or more commonly used query terms (e.g., "posts," "photos") may be combined with candidate keywords to form keyword queries. Such a template may be expressed as "[entity name] photos" or "restaurant near [place name]." Based on such a template, the client system 130 may generate keyword queries such as "mike photos" or "restaurant near union square." Although this disclosure describes generating keyword queries based on identified candidate keywords in a particular manner, this disclosure contemplates generating keyword queries based on identified candidate keywords in any suitable manner. More information on templates for generating keyword queries may be found in U.S. patent application Ser. No. 14/158,594, filed 17 Jan. 2014, which is incorporated by reference.

In particular embodiments, the client system 130 may calculate a rank for each identified candidate keyword or one of its corresponding keyword queries based at least in part on the source associated with the candidate keyword. The client system 130 may rank the keyword queries based on one or more criteria. A higher or better rank may indicate a higher probability that the user would click and conduct a search using the query. Similarly, a lower or worse rank may indicate a lower probability that the user would click and conduct a search using the query. The rank for each candidate keyword or keyword query may correspond to a priority for being presented to the querying user. A keyword query with a higher rank (e.g., second) may be more likely to be suggested to a querying user or be presented in a more noticeable position of a user interface associated with the online social network than a keyword query with a lower rank (e.g., fifth). The client system 130 may calculate the rank for a keyword query based on information received from the social-networking system 160. In particular embodiments, the information may comprise a source from which a candidate keyword comprised by the keyword query is extracted. The client system 130 may receive from the social-networking system 160 an order of preferences among the one or more sources from which the identified candidate keywords were extracted. This order of preferences may be tuned or adjusted by the social-networking system 160 based on feedback information it collects. Keyword queries corresponding to different sources may be assigned scores in different ranges by the client system 130 and ranked accordingly. As an example and not by way of limitation, the social-networking system 160 may give a higher preference to queries comprising keywords extracted from a list of trending-topic keywords than to queries comprising keywords extracted from information about entities associated with the querying user. The client system 130 may accordingly score all keyword queries associated with the list of trending-topic keywords in the range of, for example, 91-100 on a 100 scale and all keyword queries associated with entities on the online social network in the range of, for example, 81-90. Based on the scores, all keyword queries corresponding to the trending-topic list would be ranked higher than all keyword queries corresponding to entities on the online social network. In particular embodiments, the client system 130 may also calculate a rank for an identified candidate keyword or its corresponding keyword query based on a pre-assigned static score for the candidate keyword. The static score may be calculated by a server-side process of the online social network based on a plurality of factors such as, for example, a social-interaction history associated with the querying user, global social-networking activities, one or more affinity coefficients between the querying user and one or more other user of the online social network, a location associated with the querying user, other suitable factors, or any combination thereof. The social-networking system 160 may have scored the search keywords extracted from each source using a server-side process. The static scores associated with the search keywords may have been sent to and stored on the querying user's client system 130. The client system 130 may rank one or more keyword queries by directly sorting them based on the static scores of their corresponding candidate keywords. As an example and not by way of limitation, the keywords "muhammad ali death" and "prince death" may both have been extracted from a list of popular-search keywords. Because at the moment when the keywords were extracted, a larger number of users of the online social network are searching using the keyword "muhammad ali death," it may be assigned a higher static score than "prince death." The social-networking system 160 may send the static scores along with the two keywords to a user's client system 130 for caching. In response to the user's input of a text query "death," the client system 130 may identify both as candidate keywords and provide suggested queries corresponding to the two candidate keywords to user. In ranking the keywords, it may rank "muhammad ali death" higher than "prince death" based on their corresponding server-side static scores.

In particular embodiments, the client system 130 may alternatively or additionally comprise one or more ranker processes, which may be used to rank the candidate keywords and their corresponding keyword queries locally. The ranker processes may be executed based on one or more signals detected at the client system 130 or received from the social-networking system 160. The signals may be related to a non-search functionality of the social-networking system 160. As an example and not by way of limitation, the search keywords "tesla model 3" and "tesla autopilot" may both be cached on the client system 130 of a querying user and be identified as candidate keywords in response to the user's input of the text query "tes." The client system 130 may detect the activities of an application associated with the online social network that is installed on the client system 130. The detected activities may show that a post about Tesla Autopilot has recently been added to a newsfeed interface provided for display to the querying user. The client system 130 may consider this local signal in ranking the two candidate keywords and accordingly calculate a higher rank for "tesla autopilot" than "tesla model 3." The ranker process may also treat click-through data or data describing other activities of the querying user on the online social network as signals in ranking the candidate keywords and their corresponding keyword queries. As an example and not by way of limitation, the client system 130 may detect that the user recently clicked on a few links on a newsfeed interface that are associated with the Brussels Attack. Based on these signals, when the user clicks on a query field to start a query against the online social network, the client system 130 may up-rank the candidate keyword "brussels attack" accordingly.

In particular embodiments, the client system 130 may calculate the rank for each of the identified candidate keywords or their corresponding keyword queries further based on the time when the text query is received. The ranker process implemented on the client system 130 may further comprise a pre-encoded time factor. The rank associated with each candidate keyword or keyword query may further be calculated based on the time factor. As an example and not by way of limitation, the ranker process may request time and date data from the client system 130. It may up-rank the candidate keyword "transit time" during rush hours in the user's time zone (e.g., 7 a.m.-10 a.m.) based on the encoded time factor because the user is predicted to be interested in searching about transit time during such a time period. It may also up-rank the keyword query "chrismas tree" during December each year to represent the prediction that the user is more likely to be interested in holiday season supplies during that time period.

In particular embodiments, the client system 130 may calculate the rank for each of the identified candidate keywords further based on a location of the client system 130. The client system 130 may detect the querying user's location via one or more of its sensors (e.g., GPS). It may also store information about one or more locations associated with one or more of the cached search keywords. The ranker process may up-rank a particular candidate keyword or its corresponding keyword query if the location associated with the candidate keyword matches the location of the client system 130. As an example and not by way of limitation, the client system 130 may identify "new york city" and "news" as candidate keywords in response to an inputted text query "new." It may detect that the user is currently located in New York city and thereby up-rank the keyword "new york city" with respect to "news" based on the location of the user. Although this disclosure describes ranking identified candidate keywords or their corresponding keyword queries in a particular manner, this disclosure contemplates ranking identified candidate keywords or their corresponding keyword queries in any suitable manner.

In particular embodiments, the client system 130 may display one or more suggested keyword queries in response to the user inputting the one or more n-grams of the text query. Each suggested keyword query may comprise an identified candidate keyword having a rank higher than a threshold rank. The suggested keyword queries may be displayed on a webpage associated with the online social network accessed by a web browser 132 on the client system 130 of the querying user. The suggested keyword queries may alternatively be displayed in a user interface associated with an application corresponding to the social-networking system 160 that is installed on the client system 130 of the querying user. The client system 130 may compare the rank of each of the generated keyword queries with a threshold rank to determine whether to display the keyword query to the user as a suggestion. The threshold rank may be determined based at least in part on an interface in which suggested keyword queries are to be displayed. The client system 130 may then select one or more top-ranked keyword queries for display. In particular embodiments, the keyword query suggestions may be divided into one or more tiers based on the sources of their corresponding candidate keywords and be displayed according to an order of preference among the tiers. Within each tier, the keyword query suggestions may be displayed in an order consistent with the pre-assigned static scores calculated server-side for their corresponding candidate keywords. As an example and not by way of limitation, one or more keyword query suggestions comprising trending-topic keywords may be displayed at the top of a field for displaying keyword query suggestions. One or more keyword query suggestions comprising popular-search keywords may be displayed right below and be followed by keyword query suggestions corresponding to the querying user's search history. In particular embodiments, keyword query suggestions comprising candidate keywords extracted from different sources may be mixed and displayed to the querying user collectively. The order of the keyword query suggestions may be based on their ranks calculated by one or more client-side ranker processes.

In particular embodiments, the client system 130 may further receive one or more suggested queries from a server-side process of the online social network. It may then display one or more of the received suggested queries to the querying user. As a parallel process, while the client system 130 is generating and displaying keyword query suggestions based on locally-cached search keywords as described above, the client system 130 may also send a request to one or more servers 162 of the social-networking system 160 for additional suggested keyword queries matching the text query inputted by the user (e.g., calling a backend-typeahead process). The social-networking system 160 may generate in real time, upon receiving the request from the client system 130, one or more keyword queries. It may also separately calculate a rank for each of the generated keyword queries before sending the keyword queries to the client system 130. In generating and ranking the keyword queries, the social-networking system 160 may have access to a larger pool of keywords than those cached on the client system 130. It may also have access to the most up-to-date information that may be used for ranking the keyword queries. The keyword queries generated by the social-networking system 160 may or may not overlap with those generated by the client system 130. In particular embodiments, the client system 130 may preferentially adopt keyword query suggestions and their ranks received from the social-networking system 160 when there are inconsistencies between keyword queries generated server-side and those generated client-side. The transmission of information between the client system 130 and the social-networking system 160 may cause delay in the provision of keyword query suggestions received from the social-networking system 160. In particular embodiments, the client system 130 may have displayed one or more keyword query suggestions to the user when it receives one or more additional keyword query suggestions from the social-networking system 160. In such a case, the client system 130 may merge the two sets of keyword query suggestions and display some or all of them collectively to the querying user. In particular embodiments, the client system 130 may identify one or more keyword query suggestions that have already been displayed to the user and prevent such query suggestions from being removed from the user interface during the merger. This may improve user experience by avoiding the situation in which a user find herself not able to select a keyword query suggestion that she has seen, which has suddenly disappeared. Although this disclosure describes displaying keyword query suggestions in a particular manner, this disclosure contemplates displaying keyword query suggestions in any suitable manner.

Figure 4:
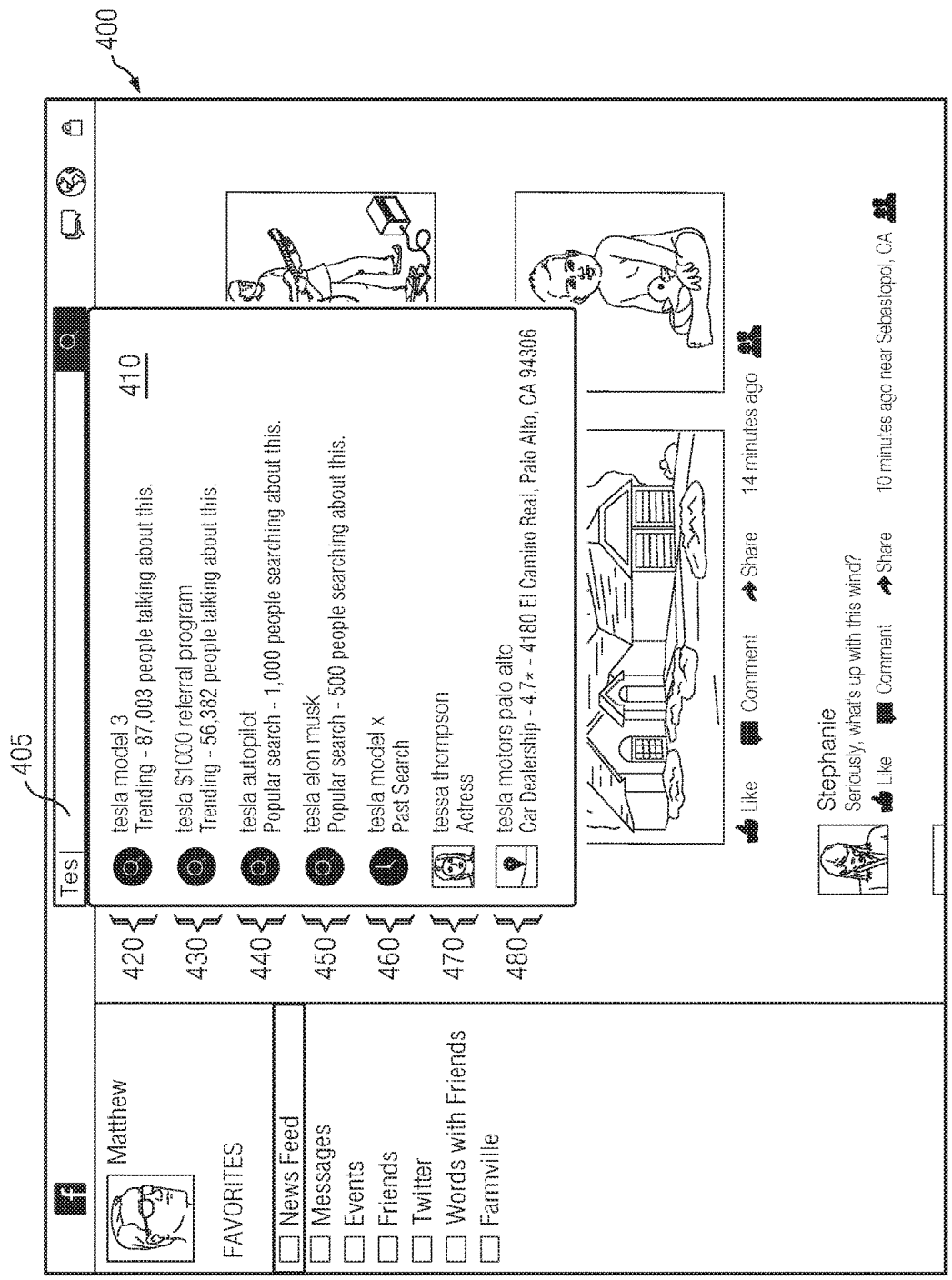
FIG. 4 illustrates an example interface displaying example suggested queries.

FIG. 4 illustrates an example interface displaying example suggested queries. In particular embodiments, the client system 130 of a user may display to the user a user interface 400 associated with the online social network. The user interface may comprise a query field 405. The user may input in the query field 405 a text query in order to search the online social network. When the user interacts with the query field 405 by clicking on or typing in it, a dropdown menu 410 may appear in the user interface 400. The dropdown menu 410 may be displayed right below the query field 405 to indicate that it is related to the query field 405. The dropdown menu 410 may comprise one or more keyword query suggestions 420-480 for display to the user. As illustrated by FIG. 4, the user may have inputted in the query field 405 the text query "Tes." In response, the client system 130 of the user may identify a set of candidate keywords matching the text query from a plurality of keywords stored on a local cache of the client system 130 and generate one or more keyword query suggestions based on the identified candidate keywords. The keyword query suggestions may then be ranked and provided for display to the user. For example, the keyword query suggestion "tesla model 3" may comprise the candidate keyword "tesla" that matches the inputted text query "Tes." The keyword query suggestions may comprise candidate keywords extracted from different sources associated with the online social network. For example, the keyword queries "tesla model 3" and "tesla $1000 referral program" may correspond to a list of trending-topic keywords; "tesla autopilot" and "tesla elon musk" may correspond to a list of popular-search keywords; "tesla model x" may correspond to a search history of the querying user; "tessa thompson" may correspond to an entity of the online social network that the querying user is interested in; "tesla motors palo alto" may correspond to a location associated with the querying user. In this example, keyword query suggestions corresponding to different sources may be arranged in the dropdown menu 410 based on their sources. The client system 130 may have received from the social-networking system 160 an order of preference with respect to the sources and displayed the query suggestions based on the order. Each of the keyword query suggestions 420-480 may comprise a brief explanation, which may indicate the source associated with the query suggestion and provide extra information about the query suggestion. For example, the keyword query suggestion "tesla model 3" may be displayed with the explanation "Trending—87,003 people talking about this." This explanation may indicate that this suggestion is made based on a list of trending-topic keywords and that many users of the online social network are mentioning the candidate keyword comprised by this query suggestion. As another example, the keyword query suggestion "tesla motors palo alto" may be displayed along with an explanation "Car Dealership—4.7*—4180 El Camino Real, Palo Alto, Calif. 94304." This explanation may indicate that this query suggestion is related to a location associated with the querying user. It may additionally provide the user with the name of an entity and an average customer review for the entity. The user may read the keyword query suggestions and their corresponding explanations displayed in the dropdown menu 410. If the user finds a keyword query that she intends to use to search the online social network, the user may choose the keyword query by clicking on it. The act of clicking may cause a search to be conducted against the online social network using the chosen keyword query. Although FIG. 4 illustrates displaying particular suggested keyword queries in a particular interface associated with the online social network in a particular manner, this disclosure contemplates displaying any suitable suggested keyword queries in any suitable interface associated with the online social network in any suitable manner.

Figure 5:
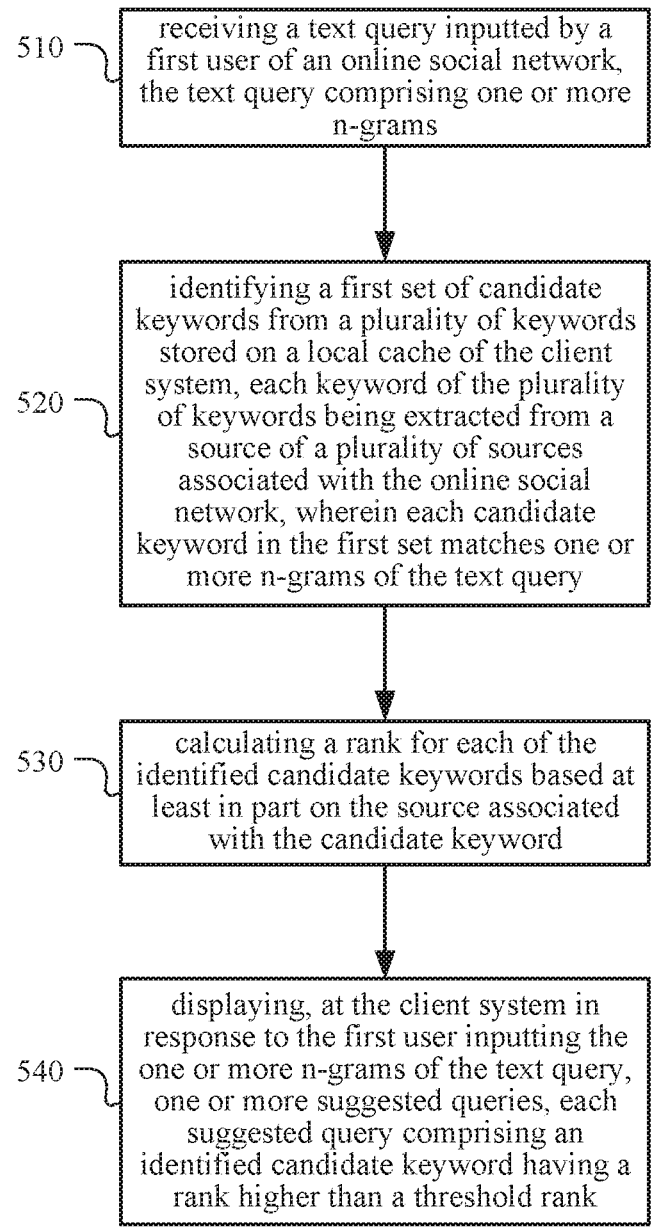
FIG. 5 illustrates an example method 500 for providing keyword query suggestions generated based on client-side cached keywords.

FIG. 5 illustrates an example method 500 for providing keyword query suggestions generated based on client-side cached keywords. The method may begin at step 510, where a client system 130 may receive a text query inputted by a first user of an online social network, the text query comprising one or more n-grams. At step 520, the client system 130 may identify a first set of candidate keywords from a plurality of keywords stored on a local cache of the client system 130, each keyword of the plurality of keywords being extracted from a source of a plurality of sources associated with the online social network, wherein each candidate keyword in the first set matches one or more n-grams of the text query. At step 530, the client system 130 may calculate a rank for each of the identified candidate keywords based at least in part on the source associated with the candidate keyword. At step 540, the client system 130 may display, in response to the first user inputting the one or more n-grams of the text query, one or more suggested queries, each suggested query comprising an identified candidate keyword having a rank higher than a threshold rank. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing keyword query suggestions generated based on client-side cached keywords including the particular steps of the method of FIG. 5, this disclosure contemplates any suitable method for providing keyword query suggestions generated based on client-side cached keywords including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
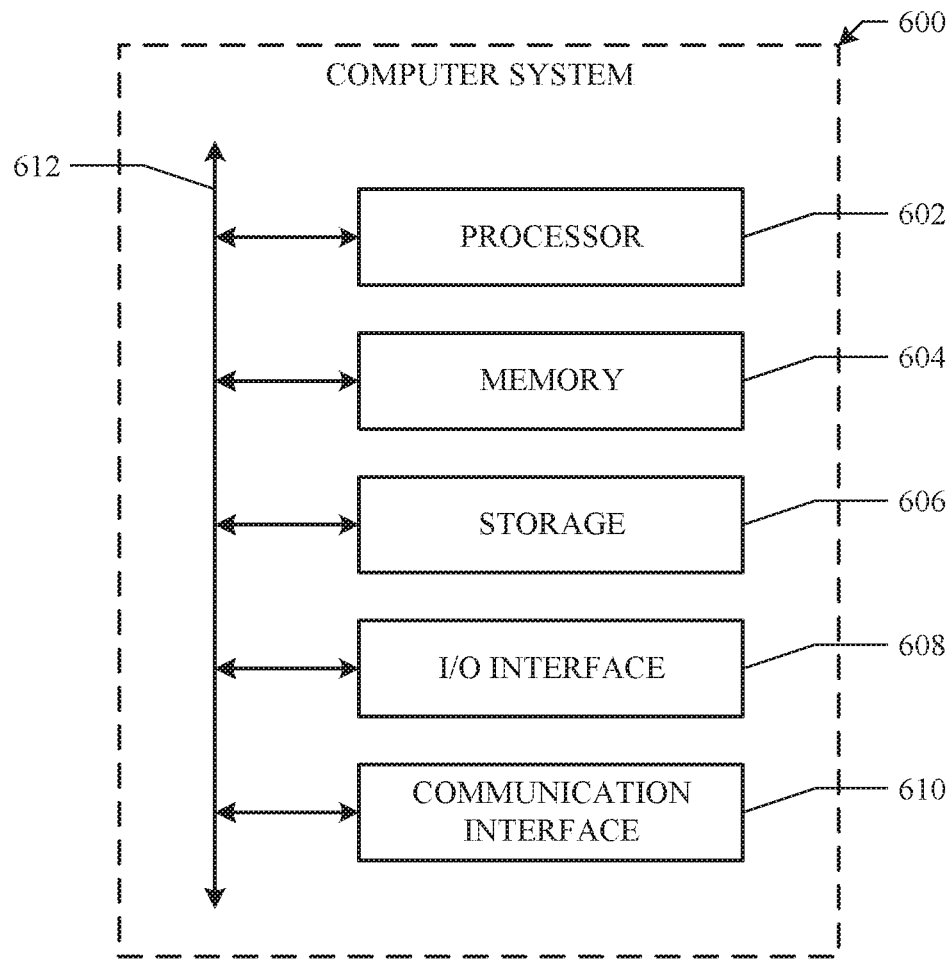
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606;

or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more processors associated with a client system:
    receiving, at the client system, a text query inputted by a first user of an online social network, the text query comprising one or more n-grams;
    identifying, by the client system, a first set of candidate keywords from a plurality of keywords stored on a local cache of the client system, each keyword of the plurality of keywords being extracted from a source of a plurality of sources associated with the online social network, wherein each candidate keyword in the first set matches one or more n-grams of the text query;
    determining, by the client system, a range of scores that correspond to the source of each of the candidate keywords;
    calculating, by the client system, a score for each of the candidate keywords, wherein the score is within the range of scores that correspond to the source of the candidate keyword;
    ranking, by the client system, each of the identified candidate keywords based at least in part on the score associated with the candidate keyword; and
    displaying, at the client system in response to the first user inputting the one or more n-grams of the text query, one or more suggested queries, each suggested query comprising an identified candidate keyword having a rank higher than a threshold rank.

2. The method of claim 1, wherein the keywords stored on the local cache of the client system comprise one or more keywords associated with one or more entities of the online social network.

3. The method of claim 1, wherein the keywords stored on the local cache of the client system comprise one or more keywords extracted from a search history associated with the first user.

4. The method of claim 1, wherein the keywords stored on the local cache of the client system comprise one or more keywords extracted from a list of trending-topic keywords.

5. The method of claim 1, wherein the keywords stored on the local cache of the client system comprise one or more keywords extracted from a list of popular-search keywords.

6. The method of claim 1, wherein the keywords stored on the local cache of the client system comprise one or more keywords associated with one or more places associated with the first user.

7. The method of claim 1, further comprising identifying one or more of the keywords to be stored on the local cache of the client system from the sources associated with the online social network based at least in part on one or more of:
    pre-assigned static scores for the keywords calculated by a server-side process of the online social network;
    a location associated with the first user;
    an interest associated with the first user, the interest being determined based on social-networking information of the first user; or
    a social-interaction history of a friend of the first user on the online social network or a user of the online social network determined to be similar to the first user.

8. The method of claim 1, further comprising updating the keywords stored on the local cache of the client system periodically.

9. The method of claim 1, further comprising updating the keywords stored on the local cache of the client system upon detection of a trigger action.

10. The method of claim 9, wherein the trigger action comprises:
    a browser client on the client system loading a webpage associated with the online social network;
    an application associated with the online social network that is installed on the client system being opened; or the first user interacting with a query field associated with the online social network.

11. The method of claim 1, further comprising:
identifying one or more of the keywords stored on the local cache of the client system that are associated with one of the sources associated with the online social network; and
updating the identified keywords associated with the one of the sources.

12. The method of claim 1, wherein ranking each of the identified candidate keywords is further based on a pre-assigned static score for the candidate keyword calculated by a server-side process of the online social network.

13. The method of claim 1, wherein ranking each of the identified candidate keywords is further based on click-through data of the first user associated with the identified candidate keyword, wherein the click-through data is stored on the client system.

14. The method of claim 1, wherein ranking each of the identified candidate keywords is further based on the time when the query is received.

15. The method of claim 1, wherein ranking each of the identified candidate keywords is further based on a location of the client system.

16. The method of claim 1, further comprising generating at least one of the suggested queries by combining an identified candidate keyword with one or more n-grams according to a query template stored on the client system.

17. The method of claim 1, further comprising:
receiving one or more suggested queries from a server-side process of the online social network; and
displaying one or more of the received suggested queries to the first user.

18. One or more computer-readable non-transitory storage media embodying software that is operable when executed to:
receive a text query inputted by a first user of an online social network, the text query comprising one or more n-grams;
identify a first set of candidate keywords from a plurality of keywords stored on a local cache of a client system, each keyword of the plurality of keywords being extracted from a source of a plurality of sources associated with the online social network, wherein each candidate keyword in the first set matches one or more n-grams of the text query;
determine a range of scores that correspond to the source of each of the candidate keywords;
calculate a score for each of the candidate keywords, wherein the score is within the range of scores that correspond to the source of the candidate keyword;
rank each of the identified candidate keywords based at least in part on the score associated with the candidate keyword; and
display, in response to the first user inputting the one or more n-grams of the text query, one or more suggested queries, each suggested query comprising an identified candidate keyword having a rank higher than a threshold rank.

19. A system comprising: one or more processors; and a non-transitory memory coupled to the processors comprising instructions executable by the processors, the processors operable when executing the instructions to:
receive a text query inputted by a first user of an online social network, the text query comprising one or more n-grams;
identify a first set of candidate keywords from a plurality of keywords stored on a local cache of a client system, each keyword of the plurality of keywords being extracted from a source of a plurality of sources associated with the online social network, wherein each candidate keyword in the first set matches one or more n-grams of the text query;
determine a range of scores that correspond to the source of each of the candidate keywords;
calculate a score for each of the candidate keywords, wherein the score is within the range of scores that correspond to the source of the candidate keyword;
rank calculate a rank for each of the identified candidate keywords based at least in part on the score associated with the candidate keyword; and
display, in response to the first user inputting the one or more n-grams of the text query, one or more suggested queries, each suggested query comprising an identified candidate keyword having a rank higher than a threshold rank.

* * * * *